TADASHI HAGIHARA, Inventor

By Wenderoth, Lind & Ponack
Attorneys

TADASHI HAGIHARA, Inventor

By, Wenderoth, Lind & Ponack
Attorneys

TADASHI HAGIHARA, Inventor

By Wenderoth, Lind & Ponack
Attorneys

TADASHI HAGIHARA, Inventor

By Wenderoth, Lind & Ponack
Attorneys

United States Patent Office
3,615,022
Patented Oct. 26, 1971

3,615,022

FILTER ELEMENT ASSEMBLY IN THE FORM OF AN ENDLESS LOOP AND THE PROCESS FOR FABRICATING THE SAME

Tadashi Hagihara, 4-1 Nagasaki Minami 5-chome, Toshima-ku, Tokyo, Japan

Filed Feb. 11, 1970, Ser. No. 10,482
Int. Cl. B01d 25/18
U.S. Cl. 210—357 3 Claims

ABSTRACT OF THE DISCLOSURE

A self-reactivation-type filter element assembly comprising a plurality of filter element units each including a plurality of filter pieces interconnected to each other in partially overlapping relation for relative movement and adapted to rotate about its own axis along a polygonal path within a filter. Each of said filter pieces comprises a sector or narrower elongated portion provided with an acute projection at one end and an integral elongated shank or wider elongated portion provided with through bores at the opposite ends. Pins extend through the aligned bores in one end of the shank or wider portion of one filter piece and in the other end of another filter piece which are in partially overlapped relation.

BACKGROUND OF THE INVENTION

There have been proposed and practically operated a great variety of filter elements of the type to which the present invention pertains and one of the prior art filter elements of such type is formed by alternately stacking a plurality of steel sheet-metal ring plates each having a bored projection at one end and a smaller number of smaller ring-shaped spacers and by passing pins through the bores in these rings so as to form a circular filter element. Thereafter, scrapers which are thinner than the spacers are secured to scraper pins in a comb fashion and the scrapers are disposed in the filtering areas in the circular filter element by securing the scrapers within the filter casing.

The filter element received in the filter casing in the above manner is rotated at a low rate by means of a drive mechanism disposed out of the filter casing and as the filter element is rotated foreign materials present within the filtering areas defined by adjacent ring plates are expelled out of the filtering areas thereby to reactivate the filter element. The thus expelled foreign materials are caused to precipitate in the lower portion of the filter casing and then discharged out of the casing at a drain cock provided in the lower portion of the filter casing.

However, the above-mentioned prior art filter element requires the provision of the specific scrapers for the purpose of expelling the foreign materials out of the filtering areas in the filter element. Such thin scrapers are usually very difficult to be precisely positioned in the filter element from the point of technological aspect and in addition, the filter element using such scrapers are very often subjected to breakdowns. Furthermore, the drive mechanism for rotating the filter element is rather complicated in construction and requires a relatively large space for installation thereof.

SUMMARY OF THE INVENTION

The present invention relates to a self-reactivation-type filter element assembly and more particularly, to a self-reactivation-type filter element assembly comprising a plurality of identical filter element units each of which includes a plurality of identical filter pieces interconnected in partially overlapping relation for relative movement and adapted to automatically and mechanically expel cakes which may clog up the filtering areas in the filter element assembly and a process for fabricating such a filter element assembly.

One object of the present invention is to automatically expel cakes which clog up the filtering areas in the above-mentioned filter element assembly by causing some of the filter pieces to swing out of a polygonal path along which the filter element assembly rotates about its own axis.

Another object of the present invention is to provide a self-reactivation-type filter element assembly in which the dimensions of the filtering areas which are relatively small can be freely selected regardless of the thickness of the filter pieces.

Another object of the present invention is to provide a self-reactivation-type filter element assembly in which if the dimensions of the filtering areas are fixed, the dimensions and shape of the filter element can be freely selected with the use of filter pieces of the same shape.

A still further object of the present invention is to provide a self-reactivation-type filter element assembly in which acute projections are provided at one end of a plurality of filter pieces for preventing said filter pieces are accordingly, said filter elements comprising such filter pieces from being deformed and also to increase the cake expelling efficiency in the filter element thereby to assure the filter element assembly a longer service life.

According to one aspect of the present invention, there is provided a filter element assembly in the form of an endless loop which comprises a plurality of filter element units vertically aligned in spaced relation each including a plurality of horizontally connected filter pieces each of which includes a sector portion having an acute angle projection at one end of its arcuate outer peripheral edge and an elongated shank portion provided with through bores at first and second ends and in which the extension line of one side of said sector portion and that of one side of said shank portion extend parallel to each other in slightly spaced relation thereby to define a lateral clearance or filtering area therebetween, each two vertically adjacent filter element units defining a vertical clearance or filtering area, link plates each having through bores at the opposite ends in alignment with said bores at first and second ends of adjacent filter pieces in the top and bottom filter element units of said filter element assembly, vertical pins extending through said aligned bores and in said link plates, a plurality of polygonal guide members vertically extending within said filter element assembly and arranged in a polygonal and spaced relation and vertical shafts extending through said guide members, one of said shafts being a drive shaft whereas the remaining ones being driven shafts.

According to another aspect of the present invention, there is provided a filter element assembly in the form of an endless loop which comprises a plurality of filter element units vertically aligned in spaced relation each including a plurality of horizontally connected filter pieces each of which includes a narrower elongated portion having an acute angle projection at one end and a wider elongated portion having through bores at first and second ends and in which the extension line of one side of said narrower portion and that of one side of said wider portion extend parallel to each other in slight spaced relation thereby to define a lateral clearance or filtering area therebetween, each two vertically adjacent filter element units defining a vertical clearance or filtering area therebetween, link plates each having through bores at the opposite ends in alignment with said bores at first and second ends of adjacent filter pieces in the top and bottom filter element units of said filter element assembly, vertical pins extending through said bores in the filter pieces and in the link plates, a plurality of polygonal guide members vertically extending within said filter element assembly and arranged in a polygonal and spaced relation and vertical shafts snugly extending through said guide members, one of said shafts being a drive shaft whereas the remaining ones being driven shafts.

The above and other objects and attendant advantages of the present invention will be more readily apparent to those skilled in the art from a reading of the following detailed description of preferred embodiments of the same in conjunction with the accompanying drawings which show the invention for illustration purpose only, but not for limiting the scope of the invention in any way.

PREFERRED EMBODIMENTS OF THE INVENTION

Figure 1:
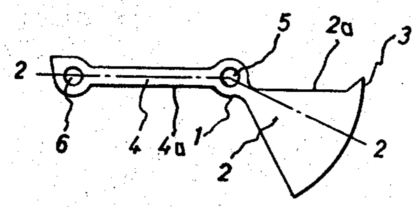
FIG. 1 is a plan view of one of preferred form of filter pieces which constitute any one of various embodiments of filter element assembly according to the present invention.
Figure 2:
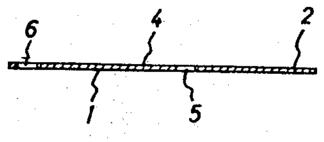
FIG. 2 is a cross-section view taken substantially along the line 2—2 of FIG. 1.

The present invention will be now described referring to the accompanying drawings and more particularly, to FIGS. 1 and 2 thereof in which one form of filter piece which constitutes one basic part of any one of various embodiments of filter element assemblies according to the present invention is illustrated. The filter piece may be formed by stamping sheet metal such as cold-rolled steel sheet, stainless steel sheet, Phosphor bronze sheet and galvanized iron sheet depending upon the purpose for which the filter element assemblies according to the present invention will be employed. The filter piece 1 includes a sector portion 2 provided with an acute angle projection 3 at one end of its arcuate outer peripheral edge and an integral elongated shank portion 4. The opposite ends of the shank portion 4 are enlarged into a substantially circular configuration and the enlarged ends are provided with through bores. The bore at the end adjacent to the sector portion 2 is shown by reference numeral 5 whereas the bore at the end remote from the sector portion is shown by reference numeral 6. The diameter of these bores 5 and 6 is substantially identical. The bore 5 will be referred to as "intermediate bore" and the bore 6 will be referred to as "end bore" hereinafter.

The extension line of one side **2*a* of the sector portion 2 (which is adapted to be disposed outwardly in each filter element unit and therefore, the side will be referred to as "outer side of the sector portion" hereinafter) and that of one side 4*a* of the elongated shank portion 4 (which is adapted to be disposed inwardly in each filter element unit and therefore, the side will be referred to as "inner side of the shank portion" hereinafter) extend parallel to each other in slightly spaced relation so as to define a narrow lateral clearance 7** therebetween and the clearance serves to provide a filtering area.

Figures 3, 4, 5:
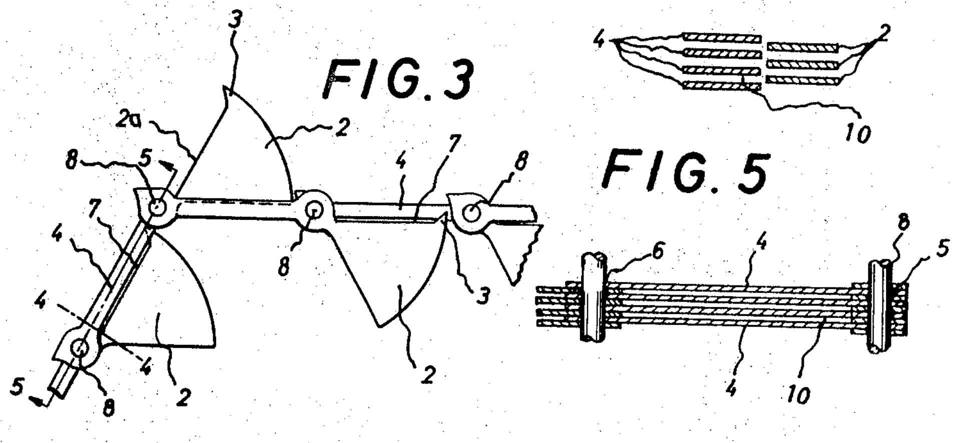
FIG. 3 is a fragmentary plan view of a portion of one embodiment of filter element assembly adapted to assume a hexagonal configuration as the assembly moves along a hexagonal path.
FIG. 4 is a cross-section view on an enlarged scale substantially taken along the line 4—4 of FIG. 3.
FIG. 5 is a cross-section view on an enlarged scale substantially taken along the line 5—5 of FIG 3.
Figure 6:
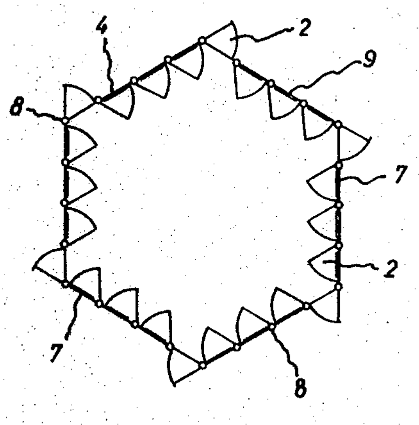
FIG. 6 is a schematic plan view of one embodiment of complete filter element assembly adapted to assume a hexagonal configuration showing the operation principle of the assembly.
Figure 7:
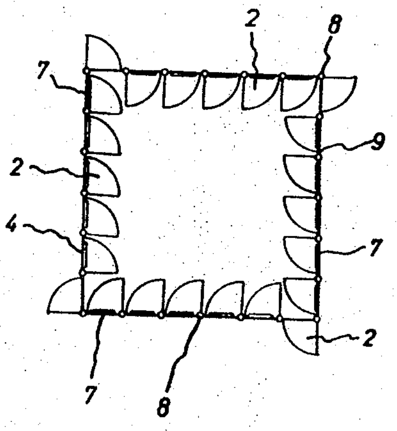
FIG. 7 is a schematic plan view of another embodiment of complete filter element assembly adapted to assume a square configuration showing the operation principle of the assembly.

In fabricating one unit of a plurality units of filter elements for each filter element assembly according to the present invention, a plurality of filter pieces of the type as shown in FIGS. 1 and 2 are connected to each other in the manner as shown in FIG. 3 in which a portion of one unit of filter element comprising the interconnected filter pieces 1 is shown. As seen from FIG. 3, two filter pieces 1 are connected together for relative movement to each other by aligning the end bore 6 of one filter piece with the intermediate bore 5 of another filter piece and then passing loosely through a pin 8 which has the diameter smaller than that of the aligned bores 5 and 6. By repeating the above procedure, one unit of filter element 9 is formed in the form of an endless loop. The shape of the endless loop may be varied depending upon the number of filter pieces and pins employed and a drive mechanism for the unit which will be described hereinafter. The unit of filter element is shown as being a hexagonal loop in FIG. 6 whereas FIG. 7 shows the filter element unit as being a square loop. It will be understood that the loop shapes of filter element units shown in FIGS. 6 and 7 are only illustrative and the filter element unit may be in any other polygonal loop configuration within the scope of the present invention. A plurality of filter element units 9 are formed by repeating the procedure for forming one unit of filter element 9 and the plurality of filter element units are assembled into one unitary assembly by the common pins 8 which extend through the aligned bores 5 and 6 in adjacent filter pieces arranged both in horizontal and vertical directions. In the thus formed filter element assembly, horizontal clearances 7 are defined by the outer sides **2*a* of the sector portions 2 and the inner sides 4*a* of the shank portions of adjacent filter pieces 1 in one each unit of filter element 9 and vertical clearances 10 are defined by the vertically aligned sector portions 2 and shank portions 4, respectively, of the filter pieces 1 in vertically adjacent units of filter elements 9 as shown in FIGS. 4 and 5. These horizontal and vertical clearances 7 and 10** are in communication with each other so as to give a dual filtering function to the filter element assembly.

The included angle of the sector portion 2 in each filter piece 1 is so selected that the sum of each one interior angle of any polygonal filter element unit of which the filter piece 1 is one basic part and the included angle of the sector portion in the filter piece may be somewhat larger than 180°. Therefore, the larger the polygonal number for a polygonal filter element unit is, the smaller the included angle for the sector portion of the filter piece is.

As will be understood from the following description of the drive mechanism for the filter element assembly, the filter element assembly is rotated along a polygonal path at a low rate. Each time a particular filter piece 1 reaches and passes by one corner in the polygonal path, the sector portion 2 of the particular filter piece 1 suddenly swings outwardly of the polygonal path so that cakes or foreign substances in the liquid to be filtered which fill up the filter surfaces or horizontal and vertical clearances 7 and 10 will be pushed out of the filter surfaces thereby to increase the filtering area of the filter element assembly.

FIG. 6 shows one embodiment of filter element assembly which is adapted to move along a hexagonal path and accordingly, to assume the configuration of the hexagonal path and FIG. 7 shows another embodiment of filter element assembly which is adapted to move along a square path and accordingly, to assume the configuration of the square path.

Figure 8:
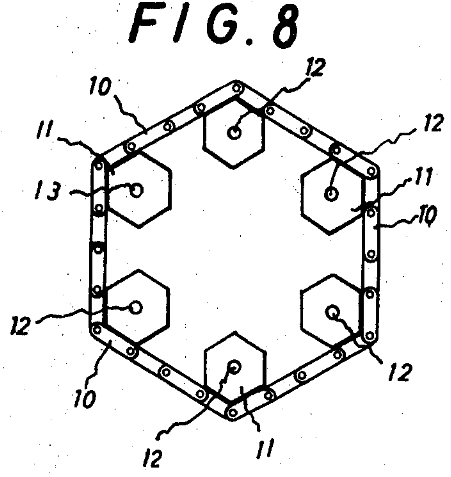
FIG. 8 is a plan view showing a drive mechanism for operating the filter element assembly as shown in FIG. 6.

FIG. 8 shows one form of drive mechanism which drives the filter element assembly 9 of FIG. 6 at a relatively low rate. The drive mechanism comprises a plurality of link plates 10 which are arranged in a hexagonal form and connected to each other by each being pivotally supported at the opposite ends by the upper and lower ends of the pins 8 which also extend through the bores 5 and 6 in adjacent filter pieces 1, six vertically extending hexagonal guide members 11 each disposed at and within each corner in the hexagonal configuration in contact with the inner side of the corner, five driven shafts 12 snugly extending through five of the six guide members 11 and a drive shaft 13 snugly extending through the last one guide member 11. The arrangement of the link plates 10 are identical at the top and the bottom of the filter element assembly.

Figure 9:
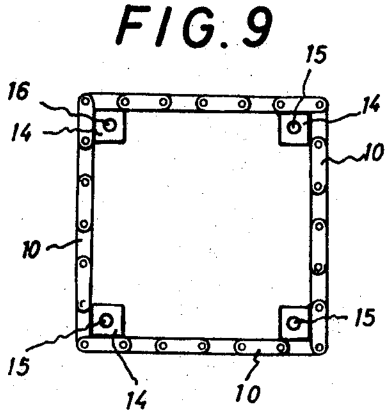
FIG. 9 is a plan view showing a different drive mechanism for operating the filter element assembly as shown in FIG. 7.

FIG. 9 shows another form of drive mechanism which is suitably employed for driving the filter element assembly as shown in FIG. 7 and the drive mechanism comprises a plurality of link plates 10 each of which is pivotally connected at the opposite ends by the upper and lower ends of the pins 8 which extend through the bores 5 and 6 in adjacent filter pieces 1 at the top and bottom of the filter element assembly, four vertically extending square guide members 14 each disposed at and within each corner in the square configuration in contact with the inner side of the corner, three driven shafts 15 snugly extending through three of the four guide members and a drive shaft 16 snugly extending through the last guide member 14. The arrangement of the link plates 10 are identical at the top and bottom of the filter element assembly.

Figure 10:
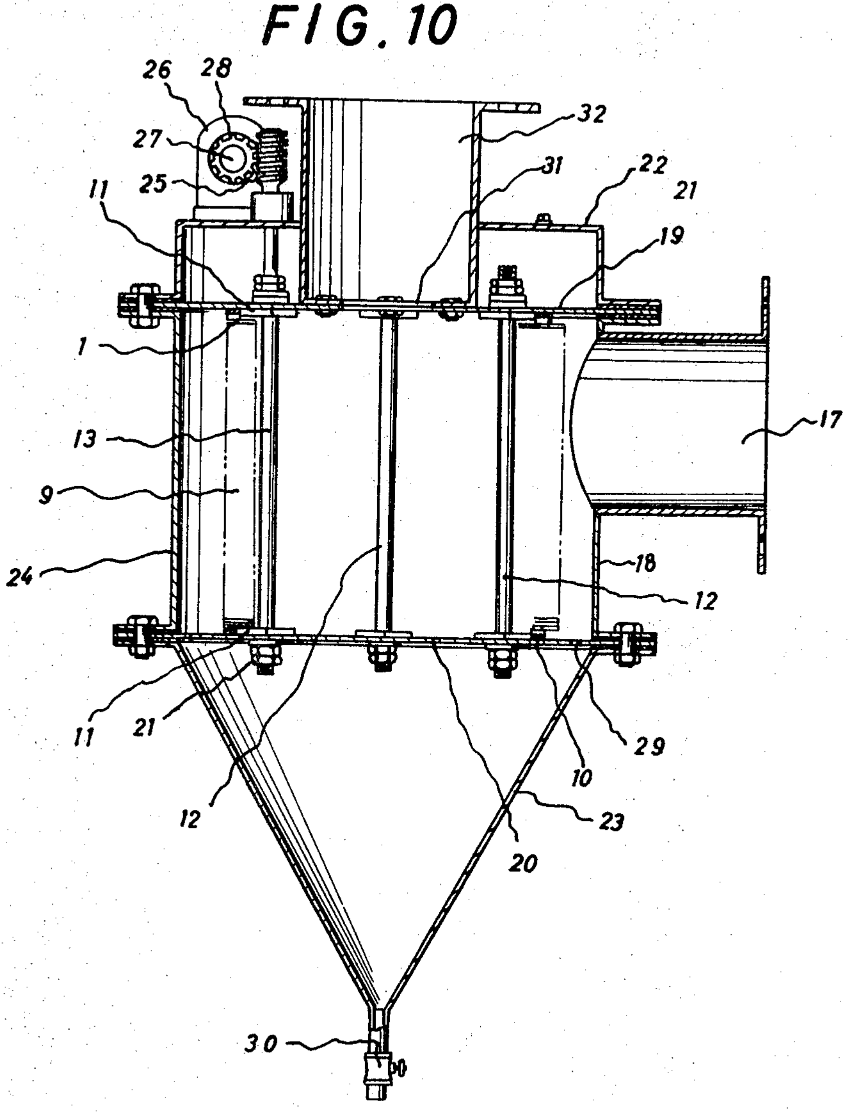
FIG. 10 is a vertically sectional view of a filter having the filter element assembly as shown in FIG. 6 incorporated therein.

FIG. 10 shows a filter which is adapted to be operated with the incorporation of the filter element assembly as shown in FIG. 6 and its drive mechanism as shown in FIG. 8 therein. The filter element assembly comprising a plurality of the filter element unit 9 and its drive mechanism are received in a housing 18 having an inlet 17 on one side wall thereof and in such a case, the drive mechanism is supported by the housing with the threaded driven shafts 12 which have their guide members 11 secured thereto extending through upper and lower plates 19 and 20. Nuts 21 are threaded onto the extended ends of the shaft 12 to hold the filter element assembly and its drive mechanism in position within the housing 18. A cover member 22 is secured to the upper plate 19 and a conical bottom box 23 is secured to the lower plate 20 thereby to form the case 24 for the filter. The threaded drive shaft 13 extends upwardly through the cover member 22 and the extended end of the drive shaft meshes with a gear 25 which is in turn meshing with a worm gear 28 which is mounted on the output shaft 27 of a motor 26. Thus, when the motor is rotated, the rotational movement of the motor is transmitted to the drive shaft at a reduced rate through the reduction gearing.

Figure 11:
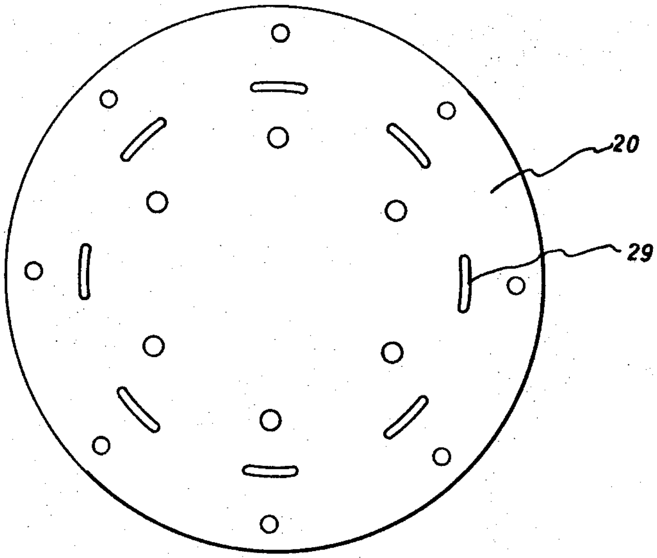
FIG. 11 is a plan view of the bottom plate of said filter as shown in FIG. 10.

As more clearly shown in FIG. 11, the lower plate 20 is provided with a plurality of angularly spaced arcuate slots 29 along the outer periphery of the filter element assembly and the slots are provided for the purpose that the sludge and slime expelled from the filter element assembly as the filter element assembly is rotated drop through the slots 29 into the concial bottom box 23. When the sludge and slime fill up the bottom box 23 to its capacity, a drain cock 30 provided at the bottom of the conical bottom box 23 is opened to allow the accumulated sludge and slime to discharge out of the box. The liquid to be filtered is introduced into the filter at the inlet 17 and subjected to the filtering action by the rotating filter element assembly. The filtrate is discharged through an opening 31 in the upper plate 19 and an outlet 32 out of the filter.

Figure 12:
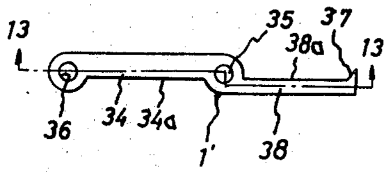
FIG. 12 is a plan view of one of modified form of filter pieces which constitute any one of various embodiments of filter element assembly according to the present invention.
Figure 13:
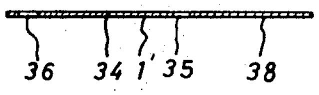
FIG. 13 is a cross-section view substantially taken along the line 13—13 of FIG. 12.

FIGS. 12 and 13 show a modified form of filter piece according to the present invention. As in the case of the filter piece 1 shown in FIGS. 1 and 2, the modified filter piece may be formed by stamping sheet metal such as cold-rolled steel sheet, stainless steel sheet, Phosphor bronze sheet or galvanized iron sheet depending upon the purpose and application for which a filter element assembly using the modified filter piece as its basic part. The filter piece 1' includes an elongated wider portion 34 which has substantially circular enlarged areas at the opposite ends provided with through bores 35 and 36, and an elongated narrower portion 38 integral with the wider portion 34 which has an acute angle projection 37 at the free or extreme end. The size of the through bores 35 and 36 is substantially identical. The bore 35 will be referred to as "intermediate bore" and the bore 36 will be referred to as "end bore," respectively, hereinafter. The extension line of one side **34*a* of the wider portion 34 (which is adapted to be disposed inwardly in each filter element unit and therefore, the side will be referred to as "inner side of the portion 34" hereinafter) and that of one side 38*a* of the narrower elongated portion 38 (which is adapted to be disposed outwardly in each filter element unit and therefore, the side will be referred to as "outer side of the portion 38") extend parallel to each other in slightly spaced relation so as to define a narrow lateral clearance 39** therebetween and the clearance serves to provide a filter area.

Figure 14:
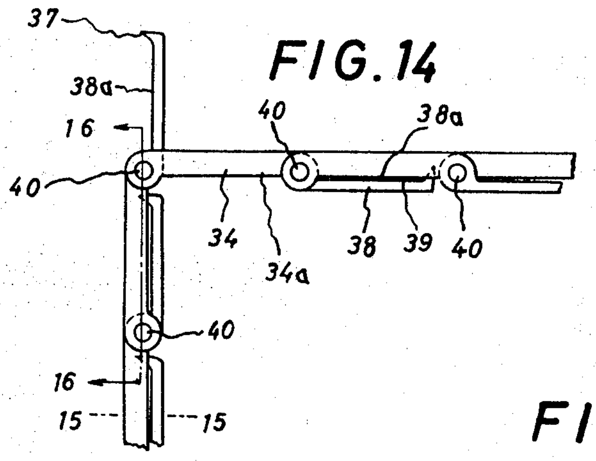
FIG. 14 is a fragmentary plan view of a portion of another embodiment of filter element assembly comprising a plurality of filter pieces as shown in FIGS. 12 and 13 and adapted to assume a square configuration as the assembly moves along a square path.
Figure 17:
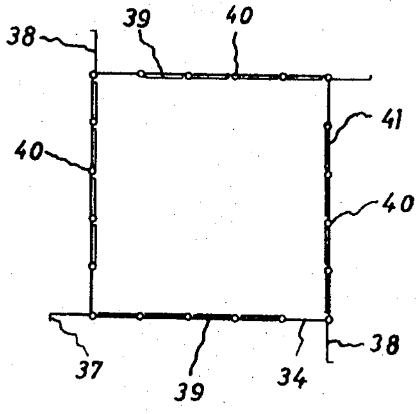
FIG. 17 is a schematic top plan view of another embodiment of complete filter element assembly comprising a plurality of filter pieces as shown in FIGS. 12 and 13 showing the operation principle.
Figure 15:
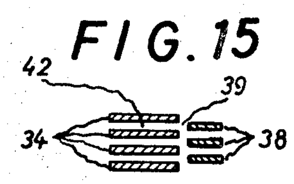
FIG. 15 is a cross-section view on an enlarged scale substantially taken along the line 15—15 of FIG. 14.
Figure 16:
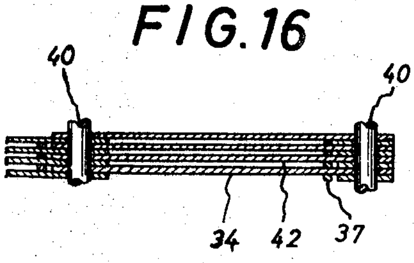
FIG. 16 is a cross-section view on an enlarged scale substantially taken along the line 16—16 of FIG. 15.

In fabricating one unit of filter element from a plurality units of filter pieces for a filter element assembly according to the present invention, the modified filter pieces 1' are interconnected as partially shown in FIG. 14 which is substantially the same as shown in FIG. 3, that is, two filter pieces 1 are connected together for relative movement to each other by aligning the end bore 36 of one filter piece with the intermediate bore 35 of another filter piece and then passing loosely through a pin 40 which has the diameter smaller than than that of the aligned bores 35 and 36 and the length longer than the thickness of a predetermined number of stacked filter element units. By repeating the above procedure, one unit of filter element is formed in the form of an endless loop as shown in FIG. 17. Although the filter element unit 41 is shown as being a square configuration in FIG. 17, the filter element unit may be formed in any desired polygonal configuration other than the shown configuration within the scope of the present invention.

A filter element assembly comprising a plurality of filter element units 39 formed in the manner mentioned above is received in the housing of the filter as shown in FIGS. 10 and 11 together with the drive mechanism shown in FIG. 9 in the same manner as mentioned in connection with the embodiment of FIG. 7 and rotated at a low rate in the filter for performing its predetermined filtering action as mentioned in connection with the embodiment of FIG. 6.

In the filter element assembly comprising a plurality of filter element units 39 each having interconnected filter pieces 1', the inner sides **34*a* of the wider portions 34 and the outer sides 38*a* of the narrower portions 38 of laterally adjacent filter pieces 1' define lateral clearances 38$a$ while the wider portions 34 and the narrower portions 38 of the vertically adjacent filter pieces 1' in vertically adjacent filter element units define vertical clearances 42 thereby to give a dual filtering function to the filter element assembly. In the embodiment of FIGS. 12 through 17, it is preferable that the height of each of the lateral clearances 38$a$ is substantially equal to that of each of the vertical clearances 42. As in the case of the foregoing embodiment, the modified filter element assembly is rotated within the filter at a low rate. Each time a particular filter piece 1' reaches and passes by a particular corner in the polygonal path (a square in this modified embodiment) during a particular rotational phase of the filter element assembly, the particular filter piece is suddenly allowed to swing outwardly of the polygonal path thereby to push foreign materials or cakes out of the clearances 38$a$ and 42** which may clog up such clearances resulting in increase in filtering area of the filter element assembly. Thus, the filter element assembly renders itself reactivated.

Any of the foregoing embodiments of the present invention is characterized by the following:

(1) During a particular rotational phase of the filter element assembly comprising a plurality of filter element units each including a plurality of interconnected filter pieces about its own axis along a polygonal path each time a particular filter piece of each filter element unit reaches one corner of the polygonal path the filter piece is allowed to swing outwardly of the polygonal configuration of the path to automatically push cakes out of the related lateral and vertical clearances thereby to reactivate the filter element assembly.

(2) The dimensions of filtering areas can be freely selected as desired.

(3) If the dimensions of filtering areas are fixed, the dimensions and configurations of each filter element unit can be freely varied by the use of the same type of filter pieces.

(4) Since the acute projection provided at the free or outer-most end of the sector or narrower elongated portion of the individual filter element piece is normally present in the vertical clearance defined by the adjacent filter pieces which are positioned just and below the filter piece on which the particular projection is provided, the projection prevents the vertically adjacent filter pieces from being deformed and accelerates the cake expelling efficiency of the filter element assembly thereby to increase the service life of the filter element assembly and accordingly, the filter in which such a filter element assembly is incorporated.

Although certain preferred embodiments of the present invention have been described and illustrated herein, it is to be understood that these are illustrative in nature and not necessarily limiting upon the scope of these teachings in their broader aspects. Many additional variations within the scope of the appended claims will occur to those skilled in the art.

What is claimed is:

1. A process for fabricating a filter element assembly in the form of an endless loop which comprises a plurality of filter element units vertically aligned in spaced relation, each including a plurality of horizontally connected filter pieces each of which includes a sector portion having an acute angle projection at one end of its arcuate outer peripheral edge and an elongated shank portion provided with through bores at first and second ends and in which the extension line of one side of said sector portion and that of one side of said shank portion extend parallel to each other in slightly spaced relation thereby to define a lateral clearance or filtering area therebetween, said process comprising the steps of aligning said bore at the first end of the shank portion of one filter piece with said bore at the second end of another filter piece, passing a pin through said aligned bores at the first and second ends of the two filter pieces, repeating the above procedure to interconnect a desired number of filter pieces so as to form a filter element assembly in the form of an endless loop comprising a plurality of filter element units vertically aligned in spaced relation, connecting each one link plate having through bores at the opposite ends to each two laterally adjacent filter pieces in the top and bottom filter element units of said assembly by passing the upper and lower ends of said pin through the bores at the opposite ends of said link plate, and disposing said filter element assembly around and in contact with a plurality of vertical guide members arranged in a polygonal and spaced relation and having vertical shafts extending therethrough, one of said shafts being a drive shaft whereas the remaining ones being driven shafts.

2. A filter element assembly in the form of an endless loop which comprises a plurality of filter element units vertically aligned in spaced relation, each including a plurality of horizontally connected filter pieces each of which includes a sector portion having an acute angle projection at one end of its arcuate outer peripheral edge and an elongated shank portion provided with through bores at first and second ends, and in which the extension line of one side of said sector portion and that of one side of said shank portion extend parallel to each other in slightly spaced relation thereby to define a lateral clearance or filtering area therebetween, each two vertically adjacent filter element units defining a vertical clearance or filtering area therebetween, link plates each having through bores at the opposite ends in alignment with said bores at first and second ends of adjacent filter pieces in the top and bottom end filter element units of said filter element assembly, vertical pins extending through said aligned bores in the filter pieces and in said link plates, a plurality of polygonal guide members vertically extending within said filter element assembly and arranged in a polygonal and spaced relation, and vertical shafts snugly extending through said guide members, one of said shafts being a drive shaft whereas the remaining ones being driven shafts.

3. A filter element assembly in the form of an endless loop which comprises a plurality of filter element units vertically aligned in spaced relation, each including a plurality of horizontally connected filter pieces each of which includes a narrower elongated portion having an acute angle projection at one end and a wider elongated portion having through bores at first and second ends, and in which the extension line of one side of said narrower portion and that of one side of said wider portion extend parallel to each other in slight spaced relation thereby to define a lateral clearance or filtering area therebetween, each two vertically adjacent filter element units defining a vertical clearance or filtering area therebetween, link plates each having through bores at the opposite ends in alignment with said bores at the first and second ends of adjacent filter pieces in the top and bottom end filter element units of said filter element assembly, vertical pins extending through said aligned bores in the filter pieces and in said link plates, a plurality of polygonal guide members vertically extending within said filter element assembly and arranged in a polygonal and spaced relation, and vertical shafts snugly extending through said guide members, one of said shafts being a drive shaft whereas the remaining ones being driven shafts.

References Cited

UNITED STATES PATENTS

| | | | |
|---|---|---|---|
| 729,296 | 5/1903 | Edgerton | 210—400 X |
| 2,365,525 | 12/1944 | Cox | 210—357 |
| 3,273,718 | 9/1966 | Riethmann et al. | 210—400 X |

JAMES L. DE CESARE, Primary Examiner

U.S. Cl. X.R.

210—400